United States Patent
Wada et al.

(10) Patent No.: US 8,139,313 B2
(45) Date of Patent: Mar. 20, 2012

(54) LIBRARY DEVICE AND CARTRIDGE CARRYING METHOD

(75) Inventors: Satoshi Wada, Tokyo (JP); Toshimitsu Kawasaki, Tokyo (JP)

(73) Assignees: NEC Corporation, Tokyo (JP); NEC Personal Products, Ltd., Tokyo (JP)

( * ) Notice: Subject to any disclaimer, the term of this patent is extended or adjusted under 35 U.S.C. 154(b) by 256 days.

(21) Appl. No.: 12/588,589

(22) Filed: Oct. 20, 2009

(65) Prior Publication Data

US 2010/0097718 A1    Apr. 22, 2010

(30) Foreign Application Priority Data

Oct. 22, 2008   (JP) ................ P2008-272181

(51) Int. Cl.
*G11B 15/68* (2006.01)
(52) U.S. Cl. .................... 360/92.1
(58) Field of Classification Search ............... 360/92.1, 360/98.06; 720/630, 645, 623; 369/30.48, 369/36.01, 30.42
See application file for complete search history.

(56) References Cited

U.S. PATENT DOCUMENTS

| | | | |
|---|---|---|---|
| 6,160,677 A | 12/2000 | Chiba | |
| 6,262,863 B1 | 7/2001 | Ostwald et al. | |
| 6,707,636 B2 * | 3/2004 | Coffin et al. | 360/92.1 |
| 2005/0062794 A1 * | 3/2005 | Kanamitsu et al. | 347/31 |

FOREIGN PATENT DOCUMENTS

| | | |
|---|---|---|
| EP | 1 056 086 A2 | 11/2000 |
| JP | 54-77111 (A) | 6/1979 |
| JP | 5-334777 (A) | 12/1993 |
| JP | 10-143959 (A) | 5/1998 |
| JP | 11-162054 (A) | 6/1999 |
| JP | 2000-90545 (A) | 3/2000 |
| JP | 2000-113543 | 4/2000 |
| JP | 2000-142915 (A) | 5/2000 |
| JP | 2000-211706 (A) | 8/2000 |

OTHER PUBLICATIONS

UK Search Report dated Dec. 21, 2009.
Notice of Reason(s) for Rejection mailed Jan. 4, 2012, in JPA No. 2008-272181,with English translation.

* cited by examiner

*Primary Examiner* — Allen Cao
(74) *Attorney, Agent, or Firm* — McGinn IP Law Group, PLLC

(57) ABSTRACT

A library device comprises a cell, a drive, and an accessor. The cell is capable of accommodating a plurality of cartridges. The drive performs a recording or reproduction of data between the cartridges and the drive. The accessor carries the cartridges between the cell and the drive. The cell is provided with a first rack gear which extends in a direction in which the accommodated cartridges are arranged. The accessor comprises an accessor base and a feed block. The accessor base comprises a second rack gear. The second rack gear extends in the extension direction of the first rack gear. The second rack gear is formed in correspondence with the first rack gear. The feed block comprises a pinion gear, a driving unit, and a holding unit. The pinion gear is meshed with the first and second rack gears. The driving unit drives the pinion gear. The holding unit holds the cartridges.

3 Claims, 6 Drawing Sheets

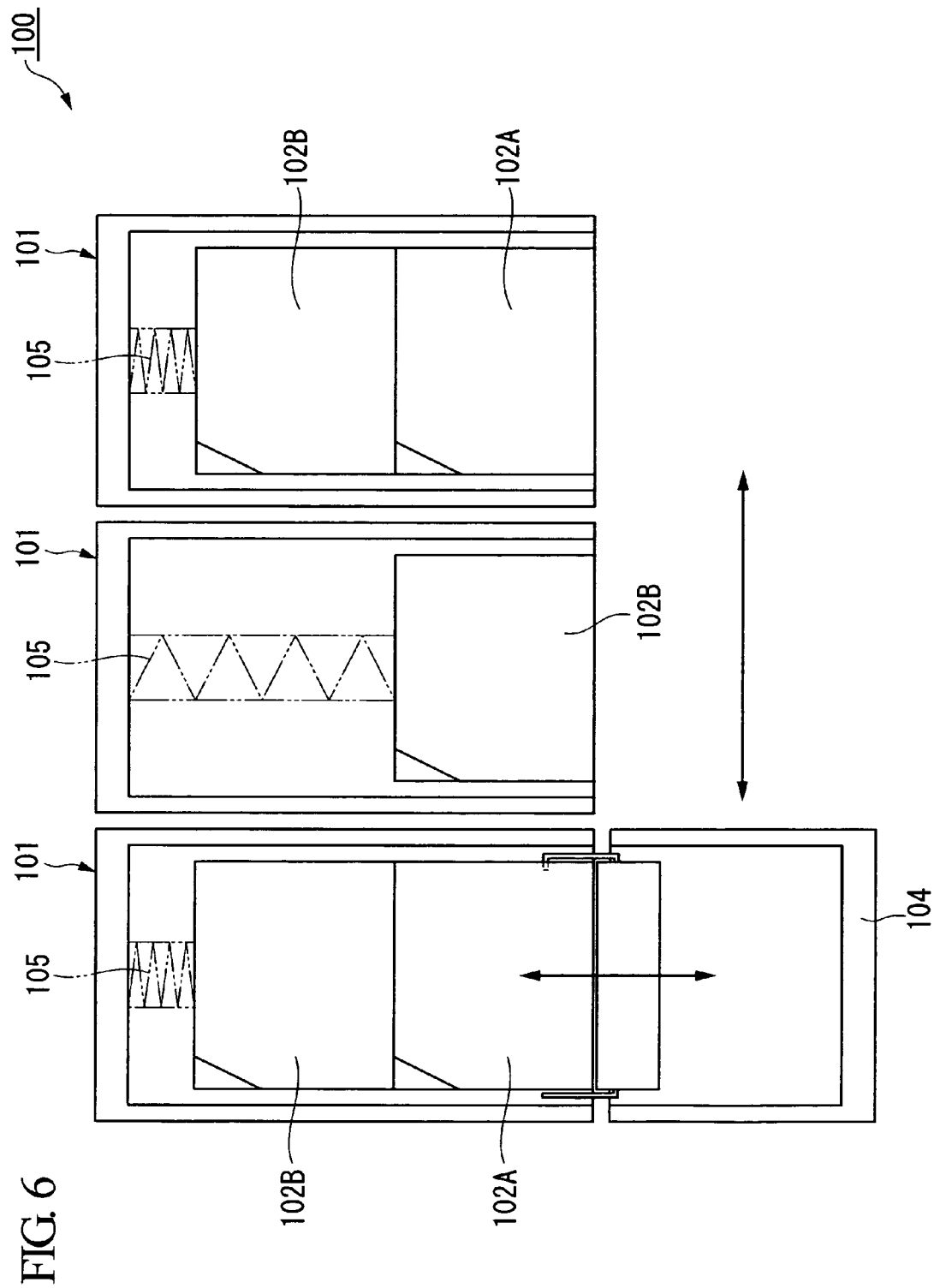

LIBRARY DEVICE AND CARTRIDGE CARRYING METHOD

BACKGROUND OF THE INVENTION

1. Field of the Invention

The present invention relates to a library device and a cartridge carrying method.

Priority is claimed on Japanese Patent Application No. 2008-272181, filed Oct. 22, 2008, the content of which is incorporated herein by reference.

2. Description of Related Art

A library device has been known, which includes a cell capable of accommodating a plurality of cartridges such as magnetic tape cartridges, a drive performing recording or reproduction of data between the cartridges and the drive, and an accessor carrying the cartridges between the cell and the drive (for example, refer to Japanese Unexamined Patent Application, First Publication, No. 2000-113543).

SUMMARY

In one aspect of the present invention, there is provided a library device that includes at least: a cell capable of accommodating a plurality of cartridges; a drive performing a recording or reproduction of data between the cartridges and the drive; and an accessor carrying the cartridges between the cell and the drive, wherein the cell is provided with a first rack gear which extends in a direction in which the accommodated cartridges are arranged, and the accessor comprises: an accessor base comprising a second rack gear which extends in the extension direction of the first rack gear, and is formed in correspondence with the first rack gear; and a feed block comprising a pinion gear being meshed with the first and second rack gears, a driving unit which drives the pinion gear, and a holding unit which holds the cartridges.

Moreover, in another aspect of the present invention, there is provided a cartridge carrying method using the above-mentioned library device that includes at least: disposing the accessor opposite to the cell accommodating the cartridges; driving the pinion gear by the driving unit so as to move the pinion gear to the cell side along the second rack gear, and move the feed block to the cell side with regard to the accessor base; moving the pinion gear from the second rack gear to the first rack gear while moving the feed block from the accessor base into the cell; holding the cartridges by the holding unit of the feed block; and moving the pinion gear from the first rack gear to the second rack gear while moving the feed block from the inside of the cell to the accessor base.

BRIEF DESCRIPTION OF THE DRAWINGS

The above features and advantages of the present invention will be more apparent from the following description of certain preferred embodiments taken in conjunction with the accompanying drawings, in which:

FIG. 6 is a plan view schematically illustrating the constitution of a known library device.

DETAILED DESCRIPTION OF THE PREFERRED EMBODIMENTS

Figure 1:
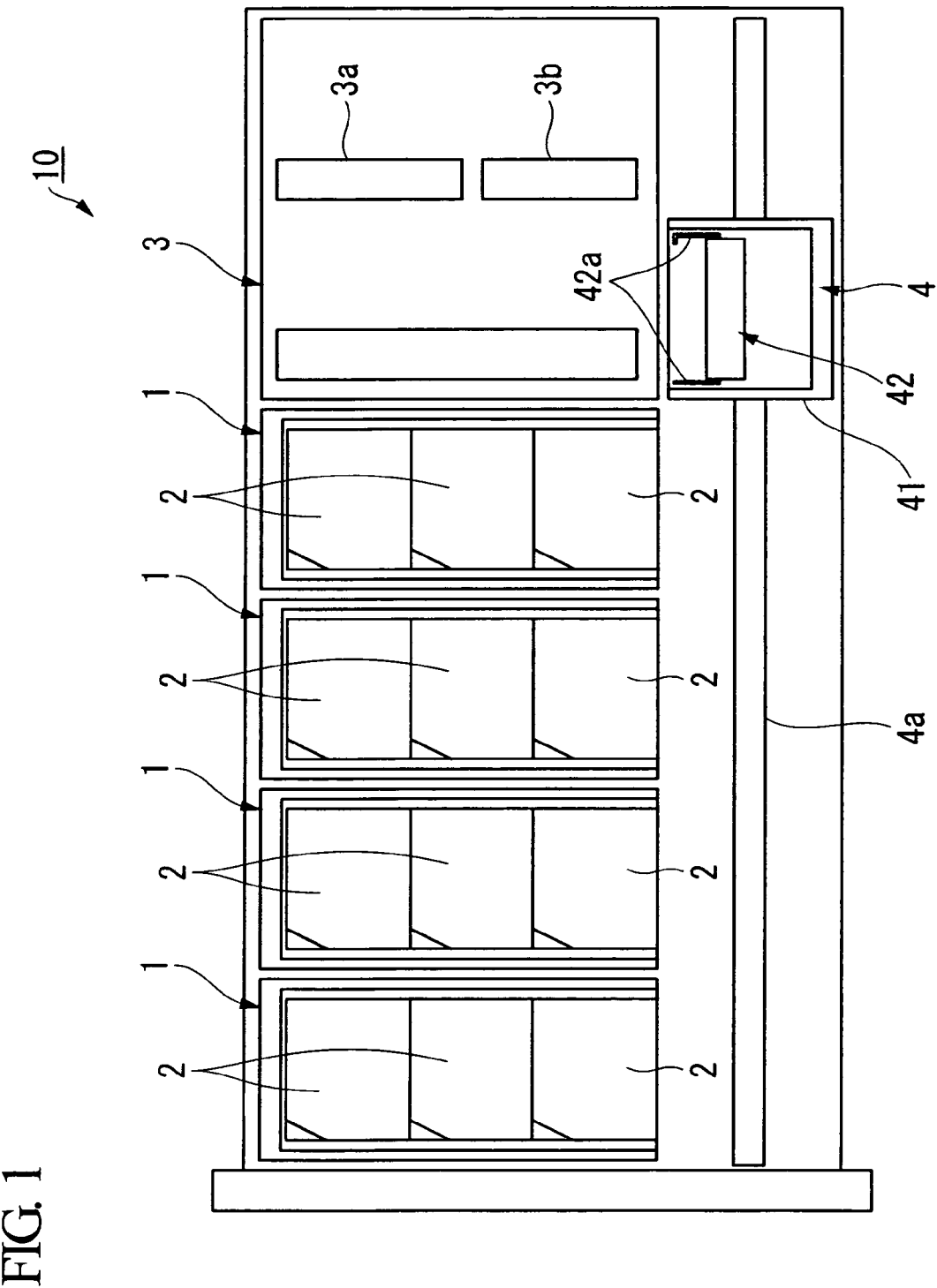
FIG. 1 is a plan view schematically illustrating the constitution of a library device according to an embodiment of the present invention.

Before describing the present invention, the related art will be explained again in detail with reference to FIG. 6, in order to facilitate the understanding of the present invention.

Meanwhile, a known library device 100 shown in FIG. 6 includes a plurality of cells 101, each of which includes therein a biasing portion 105 formed by, for example, a spring and the like that biases the accommodated cartridges 102A and 102B towards an accessor 104 side disposed opposite to the cell 101 (hereinafter, referred to as "one side"). Due to the biasing portion 105, the cartridges 102A and 102B are normally biased towards one side, and thus when the cartridge 102A disposed at one side out of the cartridges 102A and 102B is removed from the inside of the cell 101 by the accessor 104, the cartridge 102B, which is disposed on a side opposite to the one side out of the cartridges 102A and 102B, moves in the cell 101 towards the one side due to a biasing force of the biasing portion 105, and is disposed opposite to the accessor 104, while being able to be held by the accessor 104.

Moreover, the library device 100 includes a lock mechanism (not shown) so that the cartridges 102A and 102B biased by the biasing portion 105 do not drop out from an end on the one side of the cell 101 to the outside of the cell 101.

Figure 2:
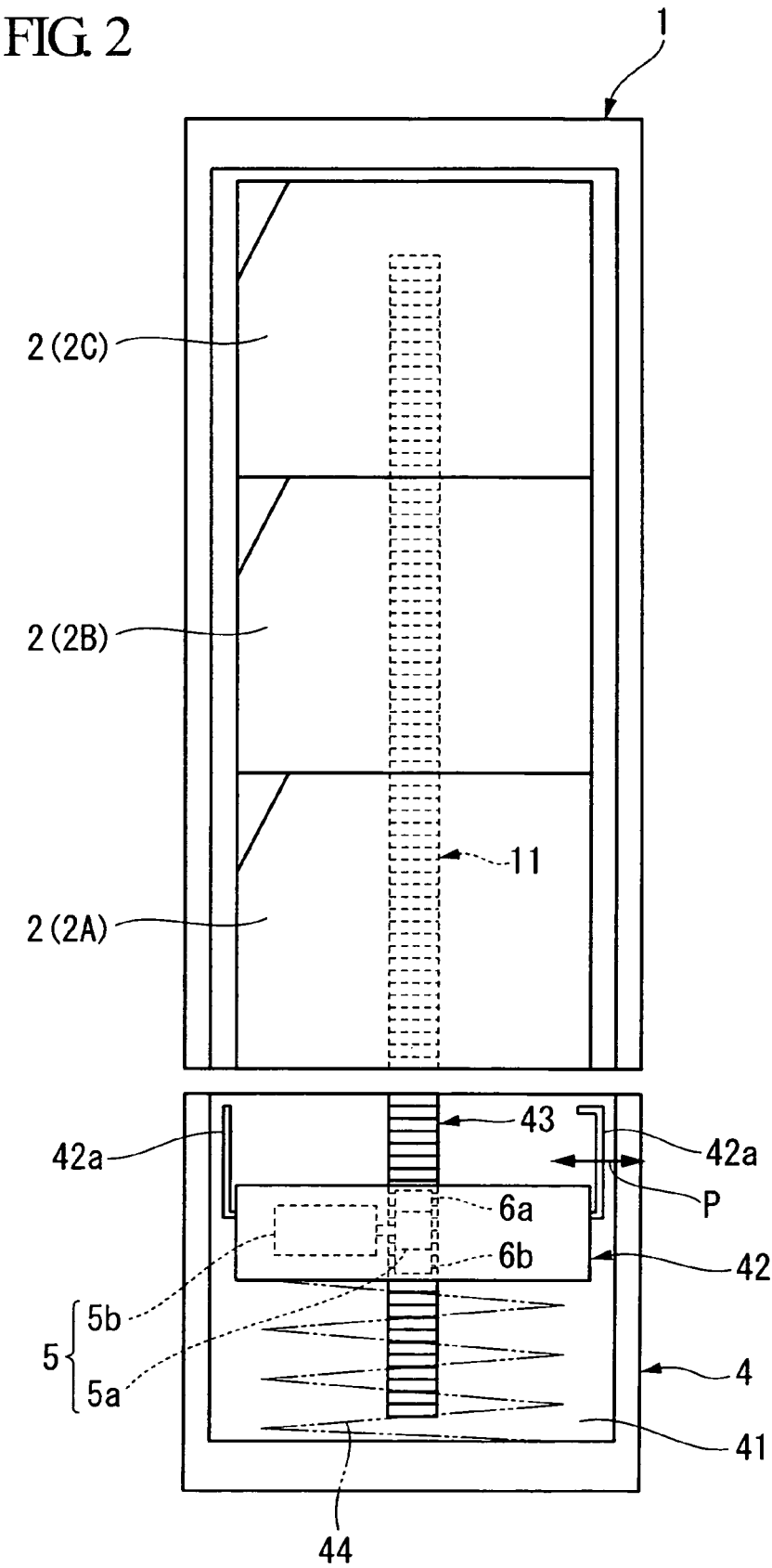
FIG. 2 is an enlarged plan view schematically illustrating a cell and an accessor of a library device according to an embodiment of the present invention.
Figure 3:
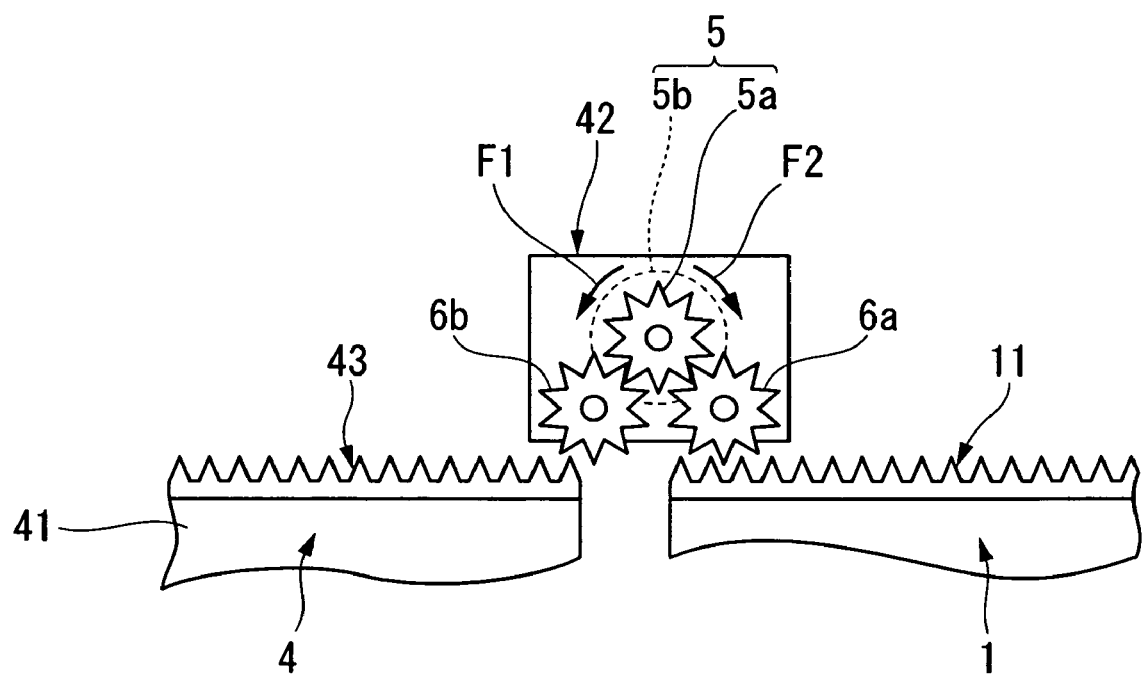
FIG. 3 is a side sectional view schematically illustrating the constitution of a feed block of a library device according to an embodiment of the present invention.
Figure 4:
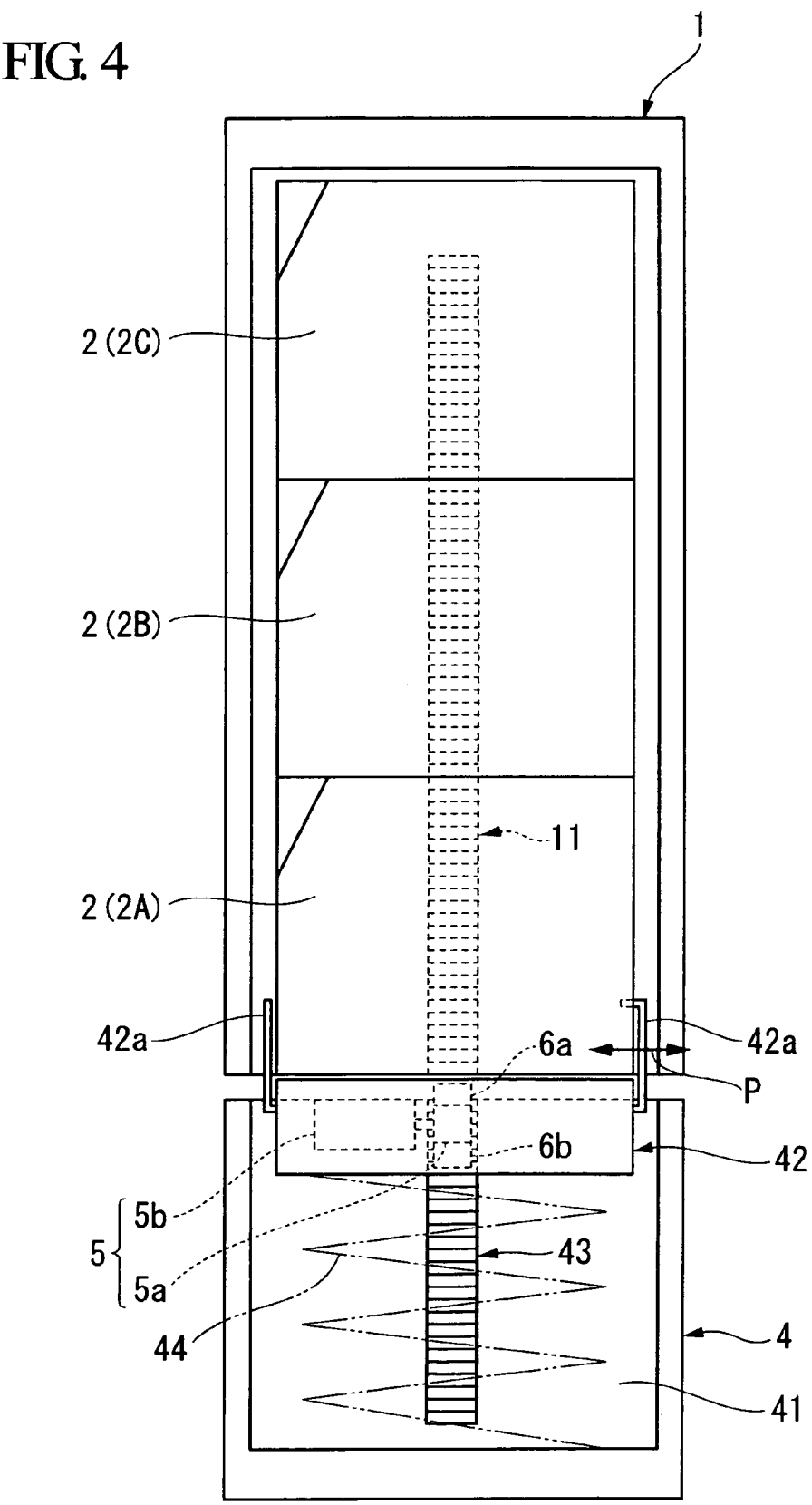
FIG. 4 is an explanatory view explaining a cartridge carrying operation in a library device according to an embodiment of the present invention.
Figure 5:
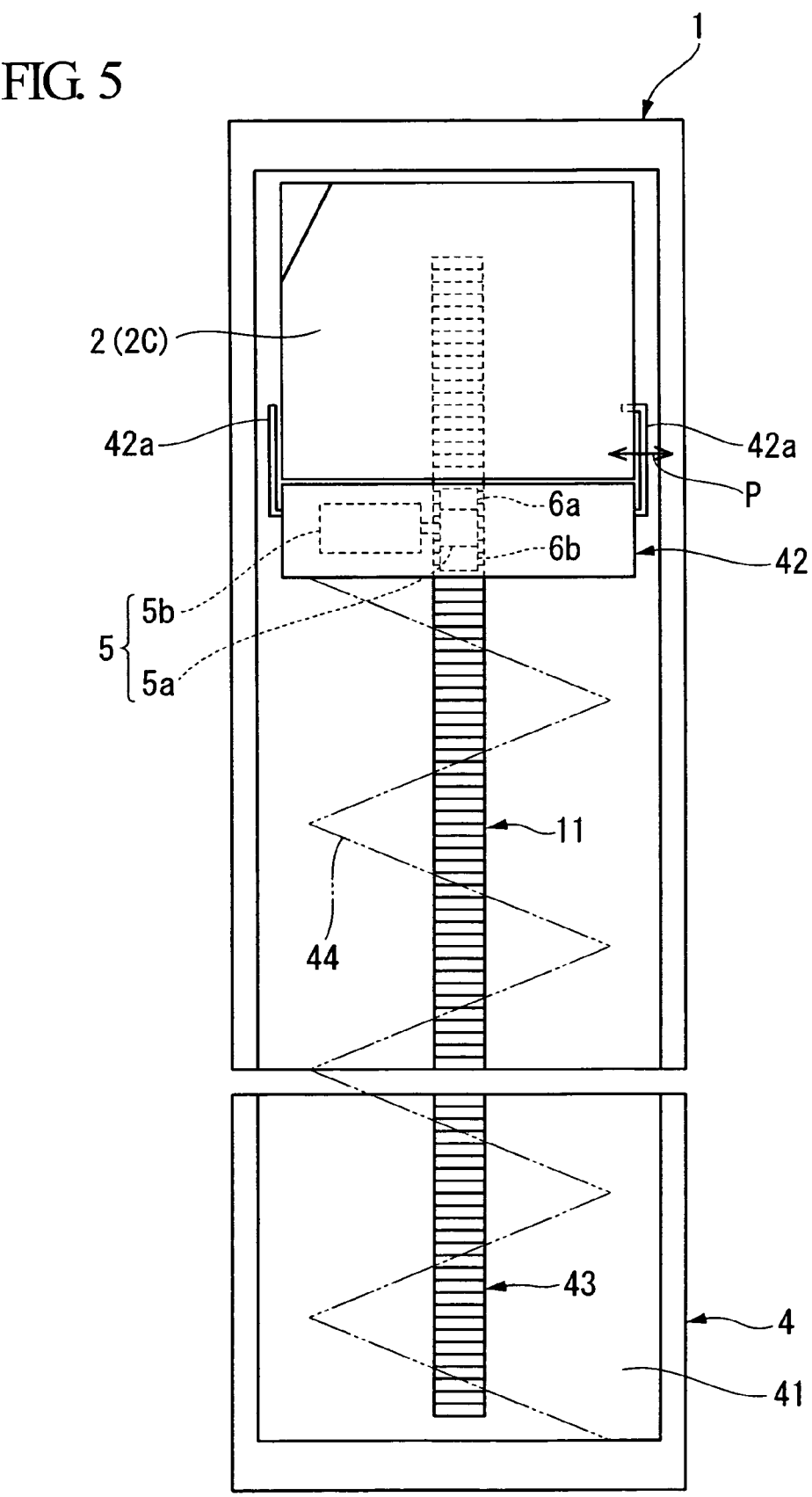
FIG. 5 is an explanatory view explaining a cartridge carrying operation in a library device according to an embodiment of the present invention.

FIG. 1 is a plan view schematically illustrating the constitution of a library device according to an embodiment of the present invention. FIG. 2 is an enlarged plan view schematically illustrating a cell and an accessor of a library device according to an embodiment of the present invention. FIG. 3 is a side sectional view schematically illustrating the constitution of a feed block of a library device according to an embodiment of the present invention. FIGS. 4 and 5 are views explaining a cartridge carrying operation in a library device according to an embodiment of the present invention.

As illustrated in FIGS. 1 and 2, a library device 10 according to this embodiment includes a plurality of cells 1 accommodating a magnetic tape cartridge (hereinafter, referred to as "cartridge") 2, a drive 3 performing recording or reproduction of data between the cartridge 2 and the drive, and an accessor 4 carrying the cartridge 2 between the cell 1 and the drive 3.

The cell 1 is formed in a rectangular parallelepiped box shape such that it accommodates a plurality of cartridges 2 in a state of being arranged in an extension direction of the cell. Also, in this embodiment, each of the cells 1 can accommodate three cartridges 2 therein in the extension direction.

Further, the accessor 4 includes an accessor base 41 which is engaged with an accessor guide 4a extending in a direction perpendicular to the extension direction of the cell 1 (hereinafter, referred to as "a width direction") in a plan view and is capable of reciprocating along the accessor guide 4a, and a feed block 42 which is provided at the accessor base 41 and has a pair of picker arms (holding unit) 42a to hold the cartridge 2.

Further, the drive 3 draws the cartridge 2 carried from the cell 1 by the accessor 4 into the drive 3 by a loading and unloading mechanism (not shown), and performs a writing and/or reading process of data between the cartridge 2 and the drive. Also, upon completion of the process, the cartridge 2 is carried by the accessor 4 from the drive 3 to the cell 1. Also, in FIG. 1, reference numeral 3a denotes a power supply, and reference numeral 3b denotes a control panel.

As illustrated in FIG. 2, the cell 1 is constituted such that its end at an accessor 4 side (hereinafter, referred to as "the one side") in the extension direction of the cell (vertical direction in FIG. 2) is opened and the accommodated cartridge 2 is transferred between the cell and the accessor 4 via the opened portion. Also, the cell 1 includes a first rack gear 11 formed therein and integrally therewith, the first rack gear having an end at the opened portion and extending in the extension direction of the cell towards a side opposite to the accessor 4 side (hereinafter, referred to as "the other side").

Further, a second rack gear 43 is formed integrally with the accessor base 41 of the accessor 4, extends in the extension direction of the first rack gear 11, and corresponds to the first rack gear 11. Specifically, an end at the other side of the second rack gear 43 in the accessor 4 disposed opposite to the cell 1 is disposed opposite to an end at the one side of the first rack gear 11 of the cell 1, and the first and second rack gears 11 and 43 are positioned at the same straight line.

Further, the feed block 42 is engaged with the second rack gear 43 of the accessor base 41 and movable in the extension direction with regard to the accessor base 41. In other words, as shown in FIG. 3, the feed block 42 is provided with a driving unit 5 consisting of a driving gear 5a and a picker motor 5b driving the driving gear 5a, and two pinion gears 6a and 6b being meshed with the driving gear 5a and spaced from each other. These pinion gears 6a and 6b are axis-supported by the feed block 42 to be rotatable, and as shown in FIG. 2, meshed with the second rack gear 43. Also, these pinion gears 6a and 6b are formed such that they are capable of being meshed with both the first and second rack gears 11 and 43.

With this constitution, as the picker motor 5b drives the driving gear 5a, the pinion gears 6a and 6b meshed with the driving gear 5a are driven in the same rotational direction. Then, the pinion gears 6a and 6b move in the extension direction with regard to the accessor base 41 along the second rack gear 43, and the feed block 42 moves in the extension direction with regard to the accessor base 41.

Specifically, as shown in FIG. 3, when the driving gear 5a is driven in a rotational direction of arrow F1, the pinion gears 6a and 6b rotate in a direction opposite to the rotational direction of the driving gear 5a, and the feed block 42 moves to the other side (the right side in FIG. 3) on the second rack gear 43.

In a process in which the feed block 42 moves to the other side in this manner, the pinion gears 6a and 6b sequentially move from on the second rack gear 43 to on the first rack gear 11, and thus the feed block 42 moves from accessor base 41 of the accessor 4 into the cell 1.

Meanwhile, when the driving gear 5a is driven in a rotational direction of arrow F2, the above-mentioned movement is reversed, and thus the feed block 42 moves to one side (the left side in FIG. 3) on the first and second rack gears 11 and 43.

Moreover, a distance between the axes of the pinion gears 6a and 6b is set to be longer than a distance between the one side end of the first rack gear 11 and the other side end of the second rack gear 43.

Further, as shown in FIG. 2, picker arms 42a are provided in pairs at both widthwise ends of the feed block 42. Out of a pair of picker arms 42a, the picker arm 42a provided at one widthwise side (the right side in FIG. 2) is driven by a hand motor (not shown) disposed at the feed block 42 to reciprocate in a width direction (a direction of arrow P shown in FIG. 2). With such a constitution, when the cartridge 2 is disposed opposite to the other side of the feed block 42, the picker arm 42a at one side is capable of being engaged with a notch (not shown) formed on an outer face at one side of the cartridge 2, and a pair of the picker arms 42a hold the cartridge 2 therebetween from the outside in a width direction.

Further, in FIG. 2, reference numeral 44 denotes a picker cable electrically connecting the accessor base 41 and the feed block 42 to each other. The picker cable 44 is stretchable according to the above movement of the feed block 42 with regard to the accessor base 41.

Next, a sequence of carrying the cartridge 2 in a library device 10 of the present embodiment will be explained.

First, as shown in FIG. 2, in the case that the cartridge 2 to be accommodated in the cell 1 is disposed at one side end in the cell 1, a sequence of carrying the cartridge 2 will be explained as follows.

In the cell 1 shown in FIG. 2, three cartridges 2A, 2B and 2C are sequentially accommodated in the cell 1 from one side to the other side in the extension direction. The cartridge 2A out of these cartridges 2A, 2B and 2C is disposed at the opened portion of one side end in the cell 1.

First, in FIG. 1, the accessor 4 moves in a width direction along the accessor guide 4a and is disposed opposite to one side of the cell 1 in FIG. 2 accommodating the cartridges 2A, 2B and 2C.

Next, in the accessor 4, out of a pair of the picker arms 42a of the feed block 42, the picker arm 42a at one side moves outwards in a direction of arrow P due to the driving of the hand motor, and thus a pair of picker arms 42a enter an opened state.

Further, in the feed block 42, the picker motor 5b drives the driving gear 5a to rotate in the direction of the arrow F1 in FIG. 3, and thus, as mentioned above, the feed block 42 moves towards the cell 1 on the other side with regard to the accessor base 41. As shown in FIG. 4, in a state in which an end face at the other side of the feed block 42 is close to or in contact with an end face at one side of the cartridge 2A in the cell 1, the picker motor 5b stops the driving gear 5a, and movement of the feed block 42 towards the other side with regard to the accessor base 41 is stopped.

In this state, as one side picker arm 42a moves inwards in the direction of the arrow P by driving of the hand motor, a tip portion of the picker arm 42a at one side engages with the notch of the cartridge 2A, and a pair of the picker arms 42a enter a closed state. Thus, the cartridge 2A is held by the feed block 42.

Next, in the feed block 42, as the picker motor 5b drives the driving gear 5a to rotate in a direction of arrow F2 in FIG. 3, the feed block 42 moves towards the one side with regard to the accessor 41, and the cartridge 2A held by the feed block 42 moves from the inside of the cell 1 to the accessor base 41 of the accessor 4. Subsequently, the picker motor 5b stops the driving gear 5a, and the movement of the feed block 42 with regard to the accessor base 41 is stopped.

Next, the accessor 4 holding the cartridge 2A moves to one widthwise side along the accessor guide 4a in FIG. 1, and is disposed opposite to the drive 3.

The drive 3 draws the carried cartridge 2A into the drive 3 by a loading and unloading mechanism (not shown), and performs a writing and/or reading process of data between the cartridge 2A and the drive. Also, upon completion of the process, due to an operation opposite to the above-mentioned operation, the cartridge 2A is carried from the drive 3 to the cell 1, and then accommodated into the cell 1.

Further, in a library device 10 according to the present embodiment, in a state in which the cartridge 2A is carried to an outside of the cell 1 as mentioned above, it is possible to subsequently carry the cartridges 2B, 2C disposed at a portion in the cell 1 excluding the one side end.

Next, in the case where the cartridge 2 to be accommodated in the cell 1 is disposed at a portion in the cell 1 excluding the one side end, a sequence of carrying the cartridge 2 will be explained as follows.

In FIG. 5, only one cartridge 2C is accommodated in the cell 1, the cartridge 2C being disposed at the other side end in the cell 1.

First, an accessor 4 is disposed opposite to the cell 1, and a pair of picker arms 42a of the feed block 42 of the accessor 4 are in an opened state.

Further, in the feed block 42, the picker motor 5b drives the driving gear 5a to rotate in a direction of arrow F1, and thus the feed block 42 moves towards the cell 1 at the other side with regard to the accessor base 41.

In a process in which the feed block 42 is moving to the cell 1 side with regard to the accessor base 41, the pinion gears 6a and 6b of the feed block 42 come to be meshed with the first rack gear 11 in the cell 1 from being meshed with the second rack gear 43 of the accessor base 41, and the feed block 42 moves from the accessor base 41 of the accessor 4 into the cell 1.

As shown in FIG. 5, in a state in which an end face at the other side of the feed block 42 is close to or in contact with an end face at one side of the cartridge 2C in the cell 1, the picker motor 5b stops the driving gear 5a, and movement of the feed block 42 towards the other side with regard to the cell 1 is stopped.

In this state, as a pair of picker arms 42a are in a closed state, the cartridge 2C is held by the feed block 42.

Next, in the feed block 42, as the picker motor 5b drives the driving gear 5a to rotate in a direction of arrow F2, the feed block 42 moves towards the accessor base 41 at one side with regard to the cell 1, and the cartridge 2C held by the feed block 42 moves from an inside of the cell 1 to the accessor base 41 of the accessor 4. If the cartridge 2C moves to the accessor 4, the picker motor 5b stops the driving gear 5a, and the movement of the feed block 42 towards the one side with regard to the accessor base 41 is stopped.

Next, the accessor 4 holding the cartridge 2C moves to one widthwise side along the accessor base 4a and is disposed opposite to the drive 3. The drive 3 performs a writing and/or reading process of data between the cartridge 2C and the drive. Upon completion of the process, due to an operation reverse to the above-mentioned operation, the cartridge 2C is carried from the drive 3 to the cell 1, and then accommodated into the cell 1.

Although, in the above description, only one cartridge 2C is disposed in the cell 1, in a case in which two cartridges 2B, 2C are disposed, it is possible to subsequently carry the cartridges 2B, 2C from the cell 1 as in the case of the above-mentioned cartridge 2C.

As explained above, by the library device 10 according to the present embodiment, in an accessor 4 disposed opposite to the cell 1, the pinion gears 6a and 6b of the feed block 42 are meshed with the second rack gear 43 of the accessor base 41. As the pinion gears 6a and 6b are driven by the driving unit 5, the pinion gears 6a and 6b move along the second rack gear 43 towards the cell 1 side with regard to the accessor base 41, and the feed block 42 axis-supporting the pinion gears 6a and 6b moves towards the cell 1 side with regard to the accessor base 41. The feed block 42 moves to a position opposite to the cartridge 2 in the cell 1 and, if it is positioned opposite to the cartridge 2, holds the cartridge 2 by the picker arm 42a. Next, as the driving unit 5 drives the pinion gears 6a and 6b to rotate in a direction reverse to the above-mentioned driving, the feed block 42 returns to its original position in the accessor base 41, and the cartridge 2 held by the picker arm 42a moves from the cell 1 to the accessor 4. The cartridge 2 moved to the accessor 4 is carried to the drive 3, wherein recording or reproduction of data is performed between the cartridge 2 and the drive 3.

In a process in which the feed block 42 is moving to the cell 1 side with regard to the accessor base 41, the pinion gears 6a and 6b are meshed with the first rack gear 11 of the cell 1 from being meshed with the second rack gear 43 of the accessor base 41, and the feed block 42 is capable of moving from the accessor base 41 into the cell 1. Thus, since the feed block 42 is constructed to be capable of moving between the accessor base 41 and the inside of the cell 1, the accommodating position of the cartridge 2 to be accommodated in the cell 1 is not defined. That is, it is unnecessary to provide a biasing portion for biasing the cartridge 2 accommodated in the cell 1 towards the accessor 4 side to position the cartridge 2 opposite to the accessor 4 or a lock mechanism for preventing dropout of the cartridge 2 biased by the biasing portion from the opened portion of the cell 1. Therefore, in comparison with the related constitution which requires the biasing portion and the lock mechanism, it is possible to make the device while saving more space, improve the cartridge 2 accommodating efficiency and reduce the cost of equipment.

Further, since the pinion gears 6a and 6b of the feed block 42 are provided in plural along the extension direction of the first and second rack gears 11 and 43, when the pinion gears 6a and 6b move between the first rack gear 11 and the second rack gear 43, they are firmly meshed with the first and second rack gears 11 and 43, and thus the above-mentioned movement of the feed block 42 is more smoothly and accurately performed.

Also, the present invention is not limited to the above embodiment, and various modifications may be applied to the present invention without departing from the spirit or scope of the present invention.

For example, although the description of the present embodiment allows that three cartridges 2 can be accommodated into each cell 1, the number of cartridges 2 capable of being accommodated in the cell 1 is not limited to the present embodiment.

Also, the provision of a detent lock mechanism and the like may be allowed in order to hold the cartridge 2 accommodated in the cell 1 at a predetermined accommodating position.

Also, although the present embodiment describes that a total of two pinion gears 6a and 6b are provided to the feed block 42, the number of the pinion gears is not limited to two. For example, only one pinion gear may be provided, or three or more pinion gears may be provided.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

With the library device and the cartridge carrying method according to the present invention, it is possible to suppress the footprint, improve the cartridge accommodating efficiency, and reduce the cost of equipment.

It is apparent that the present invention is not limited to the above embodiments, but may be modified and changed without departing from the scope and spirit of the invention.

What is claimed is:

1. A library device comprising:
   a cell capable of accommodating a plurality of cartridges;
   a drive performing a recording or reproduction of data between the cartridges and the drive; and
   an accessor carrying the cartridges between the cell and the drive,
   wherein the cell is provided with a first rack gear which extends in a direction in which the accommodated cartridges are arranged, and
   the accessor comprises:
   an accessor base comprising a second rack gear which extends in the extension direction of the first rack gear, and is formed in correspondence with the first rack gear; and
   a feed block comprising a pinion gear being meshed with the first and second rack gears, a driving unit which drives the pinion gear, and a holding unit which holds the cartridges.

2. The library device according to claim 1, wherein the pinion gears are provided in plural along the extension direction.

3. A cartridge carrying method using the library device according to claim 1, comprising:
   disposing the accessor opposite to the cell accommodating the cartridges;
   driving the pinion gear by the driving unit so as to move the pinion gear to the cell side along the second rack gear, and move the feed block to the cell side with regard to the accessor base;
   moving the pinion gear from the second rack gear to the first rack gear while moving the feed block from the accessor base into the cell;
   holding the cartridges by the holding unit of the feed block; and
   moving the pinion gear from the first rack gear to the second rack gear while moving the feed block from the inside of the cell to the accessor base.

* * * * *